United States Patent
Zhang et al.

(10) Patent No.: US 12,026,071 B2
(45) Date of Patent: *Jul. 2, 2024

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Ming Zhang, Shanghai (CN); Ruyao Zhang, Shanghai (CN); Yuhong Nie, Shanghai (CN); Wei Lin, Shanghai (CN); Pengfei Wu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,016

(22) Filed: Jan. 19, 2023

(65) Prior Publication Data

US 2023/0153211 A1 May 18, 2023

Related U.S. Application Data

(63) Continuation of application No. 17/039,934, filed on Sep. 30, 2020, now Pat. No. 11,599,425.

(30) Foreign Application Priority Data

Aug. 7, 2020 (CN) .......................... 202010790766.X (51) Int. Cl.
*G06F 16/23* (2019.01)
*G06F 11/14* (2006.01)

(52) U.S. Cl.
CPC ...... *G06F 11/1469* (2013.01); *G06F 16/2379* (2019.01); *G06F 2201/80* (2013.01)

(58) Field of Classification Search
CPC ............. G06F 11/1469; G06F 16/2379; G06F 2201/80; G06F 11/1448; G06F 11/1458; G06F 16/2365; G06F 16/27
See application file for complete search history.

(56) References Cited

U.S. PATENT DOCUMENTS

| | | | |
|---|---|---|---|
| 9,015,123 | B1 | 4/2015 | Mathew et al. |
| 2013/0060842 | A1 | 3/2013 | Grossman |
| 2020/0133780 | A1 | 4/2020 | Zhang et al. |
| 2020/0341893 | A1 | 10/2020 | Lei et al. |

*Primary Examiner* — Apu M Mofiz
*Assistant Examiner* — Cindy Nguyen
(74) *Attorney, Agent, or Firm* — Chamberlain, Hrdlicka, White, Williams & Aughtry; Aly Z. Dossa (57) ABSTRACT

Embodiments of the present disclosure relate to a method for storage management, an electronic device, and a computer program product. According to an example implementation of the present disclosure, a method for storage management is provided, which comprises receiving an access request for target metadata from a user at a node among a plurality of nodes included in a data protection system, wherein the access request includes an identification of the target metadata; based on the identification, acquiring target access information corresponding to the identification from a set of access information for the user, wherein the target access information records information related to access to the target metadata; and if the target access information is acquired, determining the target metadata based on the target access information.

11 Claims, 7 Drawing Sheets

| Metadata identification | Metadata content | Update time | Acquisition count |
|---|---|---|---|
| Metadata 1 | Content 1 | Time 1 | Count 1 |
| Metadata 2 | Content 2 | Time 2 | Count 2 |
| Metadata 3 | Content 3 | Time 3 | Count 3 |

METHOD, ELECTRONIC DEVICE AND COMPUTER PROGRAM PRODUCT FOR STORAGE MANAGEMENT

CROSS-REFERENCE TO RELATED APPLICATIONS

This is a continuation of U.S. patent application Ser. No. 17/039,934, filed Sep. 30, 2020, which application claims priority to Chinese Patent Application 202010790766.X filed on Aug. 7, 2020. These applications are hereby incorporated by reference in their entirety.

TECHNICAL FIELD

Embodiments of the present disclosure generally relate to storage management, and in particular, to a method for storage management, an electronic device, and a computer program product.

BACKGROUND

In a data protection system using decentralized metadata search management, as the number of users increases, so does the amount of metadata of the users. In this case, the search speed will be significantly reduced. In addition, the users may log into the data protection system in different geographic locations to manage their backups stored in the data protection system through search. However, it is difficult to ensure consistent user experience in the backup searching process in different geographic locations.

SUMMARY OF THE INVENTION

Embodiments of the present disclosure provide a method for storage management, an electronic device, and a computer program product.

In a first aspect of the present disclosure, there is provided a method for storage management. The method includes: receiving an access request for target metadata from a user at a node among a plurality of nodes included in a data protection system, wherein the access request includes an identification of the target metadata; based on the identification, acquiring target access information corresponding to the identification from a set of access information for the user, wherein the target access information records information related to access the target metadata; and if the target access information is acquired, determining the target metadata based on the target access information.

In a second aspect of the present disclosure, there is provided an electronic device. The device includes at least one processing unit and at least one memory. The at least one memory is coupled to the at least one processing unit and stores instructions configured to be executed by the at least one processing unit. The instructions, when executed by the at least one processing unit, cause the device to perform actions. The actions include: receiving an access request for target metadata from a user at a node among a plurality of nodes included in a data protection system, wherein the access request includes an identification of the target metadata; based on the identification, acquiring target access information corresponding to the identification from a set of access information for the user, wherein the target access information records information related to access the target metadata; and if the target access information is acquired, determining the target metadata based on the target access information.

In a third aspect of the present disclosure, there is provided a computer program product. The computer program product is tangibly stored on a non-transitory computer-readable medium and includes machine-executable instructions; and the machine-executable instructions, when executed, cause a machine to perform any step of the method described according to the first aspect of the present disclosure.

The summary is provided to introduce the selection of concepts in a simplified form, which will be further described in the detailed description below. The summary is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, identical or corresponding reference numerals represent identical or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or."

The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, traditionally, in a data protection system using decentralized metadata search management, an increase in the number of users will lead to an increase in metadata, which leads to a decrease in search speed, so the expansion of the traditional data protection system is limited.

In addition, the users are mobile, and they may log in to the data protection system at different times and in different geographic locations to manage their backups stored in the data protection system through search. For example, a user may log into the data protection system in the UK on Monday, and log in to the data protection system in China on Wednesday. In this case, it is difficult to ensure consistent user experience during the backup searching process at different times and different geographic locations.

Further, different users may have different search preferences. For example, the data protection system may open more search functions to advanced users, but only limited search functions to ordinary users. However, the traditional data protection system does not support searching based on users' search preferences.

According to an example embodiment of the present disclosure, an improved solution for storage management is proposed. In this solution, an access request for target metadata from a user is received at a node among a plurality of nodes included in a data protection system, where the access request includes an identification of the target metadata; based on the identification, target access information corresponding to the identification is acquired from a set of access information for the user, wherein the target access information records information related to access the target metadata; and if the target access information is acquired, the target metadata is determined based on the target access information.

In this way, the solution stores the access information in the local node where the user logs in, so that the local node may quickly provide the user with metadata content in the access information as the target metadata. In addition, because the access information is user specific, it can support searching according to the user's search preferences. Therefore, the storage efficiency and user experience may, in one or more embodiments of the invention, be significantly improved.

Figure 1:
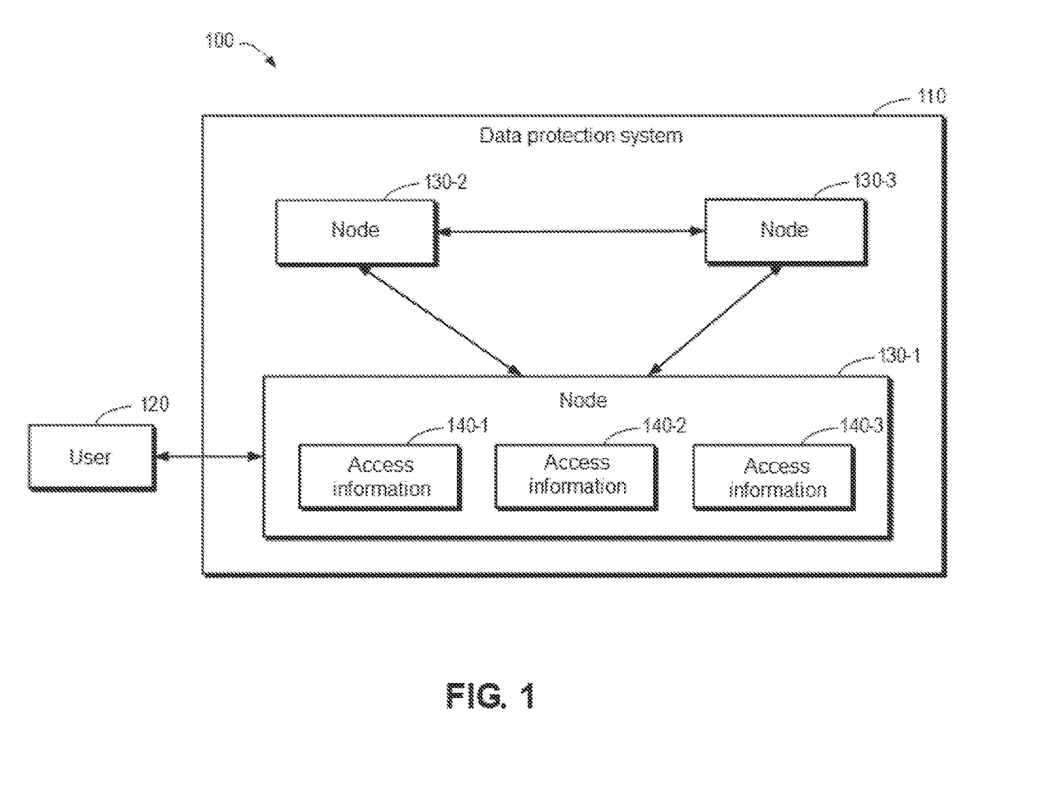
FIG. 1 shows a schematic diagram of an example of a storage management environment in which some embodiments of the present disclosure can be implemented.

In the following, specific examples of this solution will be described in more detail with reference to FIG. 1 to FIG. 7. FIG. 1 shows a schematic diagram of an example of storage management environment 100 according to some embodiments of the present disclosure. Storage management environment 100 includes data protection system 110 and user 120.

Data protection system 110 includes a plurality of nodes, such as nodes 130-1 to 130-3 (hereinafter, collectively referred to as "node 130"). Node 130 stores access information, such as access information 140-1 to 140-3 (hereinafter, collectively referred to as "access information 140"). Access information 140 records information related to an access to metadata. It should be understood that the number of nodes 130 and the amount of access information 140 are only exemplary, data protection system 110 may include any suitable number of nodes 130, and nodes 130 may store any suitable amount of access information 140.

In some embodiments, the access information is specific to user 120. In this case, node 130 may group the access information of multiple different users into corresponding multiple groups of access information. For example, node 130 may use multiple access information lists to store access information, and each access information list is specific to one user.

User 120 may send an access request for metadata (hereinafter, referred to as "target metadata") to node 130 (such as node 130-1) in data protection system 110. In some embodiments, user 120 may log in to node 130-1 and send an access request to node 130-1. User 120 may be any computing device, for example but not limited to, a distributed computing system, a mainframe, a server, a personal computer, a desktop computer, a laptop computer, a tablet computer, a wearable device, etc.

The access request may include an identification of the target metadata, for example, any appropriate information that can uniquely identify the target metadata, such as the name and hash value of the target metadata. Node 130-1 may determine whether access information (hereinafter, referred to as "target access information"), such as access information 140-1, corresponding to the identification is stored on node 130-1 based on the identification of the target metadata. For example, node 130-1 may determine whether there is target access information corresponding to the identification in the stored access information list for user 120.

If the target access information is stored on node 130-1 and the target access information has not expired, node 130-1 may send metadata content in the stored target access information to user 120 as the target metadata, which can significantly improve the speed at which user 120 acquires the target metadata.

If the target access information is not stored on node 130-1, or the target access information has expired, node 130-1 will send the identification of the target metadata to other nodes (such as nodes 130-2 and 130-3) in data protection system 110, and receive the target metadata from the other nodes, thereby still ensuring that user 120 can acquire the target metadata.

In this way, the solution stores the access information in the local node where the user logs in, so that the local node may quickly provide the user with the metadata content in the access information as the target metadata. In addition, since the access information is user specific, it can support searching according to the user's search preferences. Therefore, the storage efficiency and user experience may be significantly improved.

Figure 2:
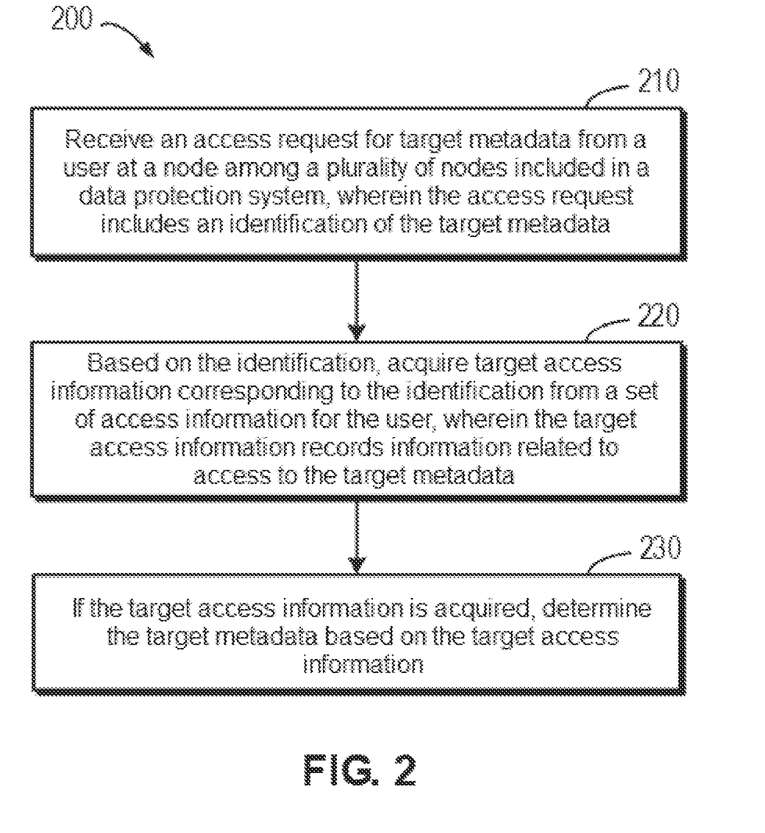
FIG. 2 shows a flowchart of a method for storage management according to some embodiments of the present disclosure.

The operations performed by node 130-1 will be described below in detail with reference to FIG. 2 to FIG. 6. FIG. 2 shows a flowchart of method 200 for storage management according to some embodiments of the present disclosure. For example, method 200 may be performed by node 130-1 as shown in FIG. 1. It should be understood that method 200 may further include additional steps that are not shown and/or may omit the shown steps, and the scope of the present disclosure is not limited in this aspect. For ease of understanding, method 200 will be described with reference to FIG. 3 to FIG. 6.

At 210, node 130-1 receives an access request for target metadata from a user. The access request includes an identification of the target metadata. At 220, node 130-1 acquires target access information (such as access information 140-1) corresponding to the identification from a set of access information for the user based on the identification of the target metadata. The target access information records information related to an access to the target metadata.

Figure 3:
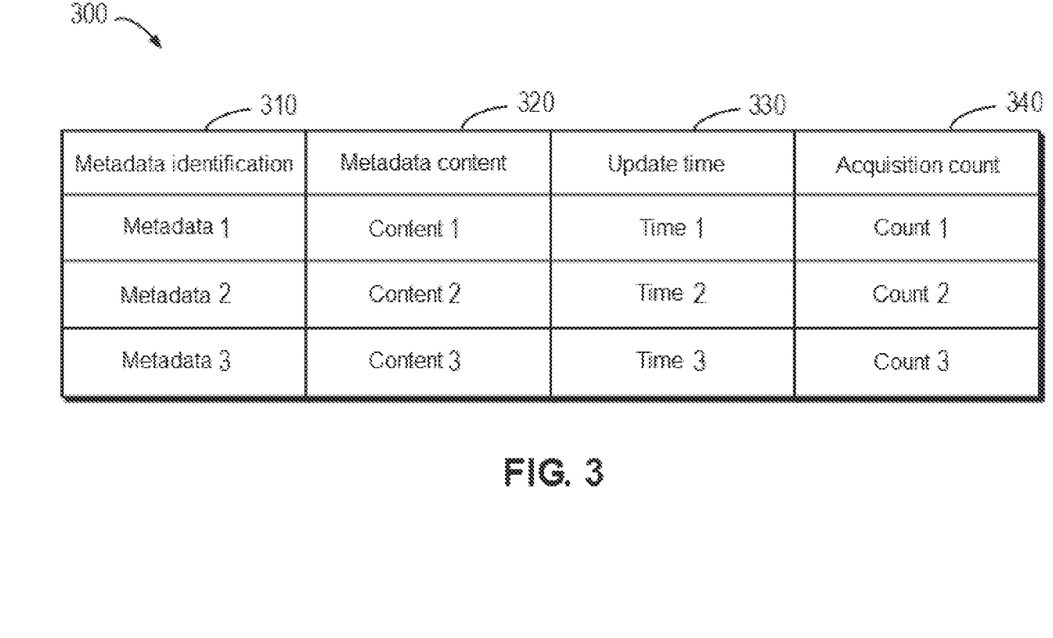
FIG. 3 shows a schematic diagram of an example of access information according to some embodiments of the present disclosure.

FIG. 3 shows a schematic diagram of an example of access information 140 according to some embodiments of the present disclosure. As shown in FIG. 3, access information 140 may include metadata identification 310, metadata content 320, update time 330 of the access information, and/or acquisition count 340 of the access information.

For example, metadata identification 310 may be any appropriate information that can uniquely identify the metadata, such as the name and hash value of the metadata. Metadata content 320 may be index information for addressing the metadata, description information of the metadata, and the like. Update time 330 of the access information is the time when the access information was updated last time. Acquisition count 340 of the access information is the number of times the access information is acquired or searched for.

Update time 330 of the access information may be used to determine whether the metadata content stored in node 130 has expired, so as to determine whether to return the target metadata from the local node or acquire updated target metadata from other nodes.

In addition, in some embodiments, in order to save the storage space of node 130, the quantity of access information of node 130 for each user may be limited. In this case, replacement algorithms such as least recently used (LRU) and first-in-first-out (FIFO) may be used to manage the access information stored in node 130 for each user. To this end, update time 330 of the access information and/or acquisition count 340 of the access information may be used to implement replacement.

Referring back to FIG. 2, at 230, if the target access information is acquired, node 130-1 determines the target metadata based on the target access information. Specifically, the target access information is divided into two situations: expired and unexpired. In some embodiments, access request may include initiation time of the access request. In this case, expiration of the target access information means that a difference between the initiation time of the access request and the update time in the target access information exceeds a predetermined threshold difference. When the target access information has it expired, then in one or more embodiments of the invention, this means that a difference between the initiation time and the update time is shorter than the threshold difference.

To this end, node 130-1 determines the difference between the initiation time and the update time, and performs different storage management processes based on whether the difference exceeds the threshold difference. It should be understood that in some embodiments, the access request does not include initiation time. In this case, the difference may also be determined based on the time when node 130-1 receives the access request. The storage management process in the case where the target access information has expired will be described in detail below with reference to FIG. 4, and the storage management process in the case where the target access information has not expired will be described in detail with reference to FIG. 5.

Figure 4:
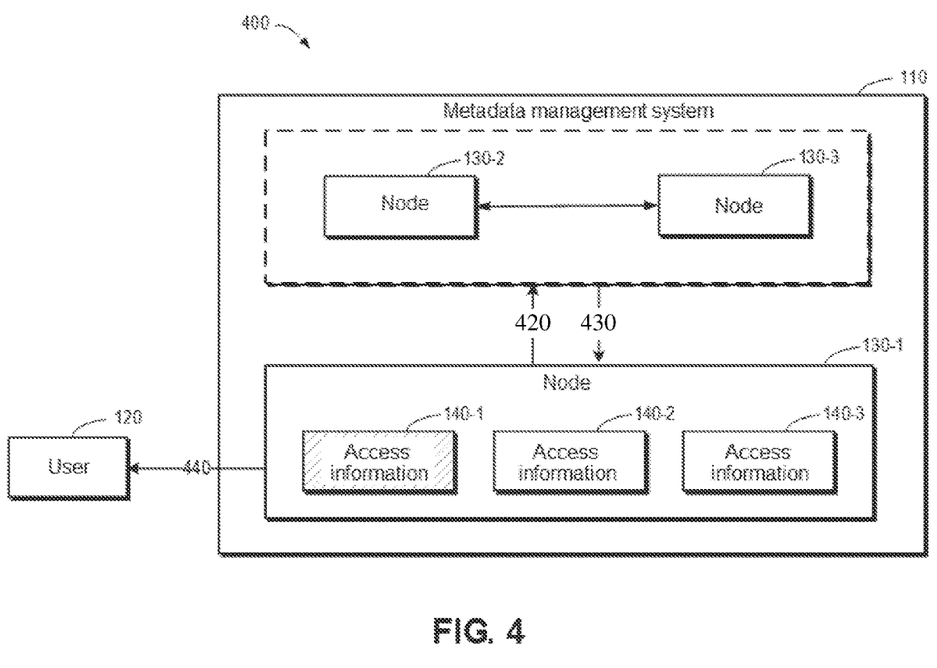
FIG. 4 shows a schematic diagram of an example of a storage management process in the case where target access information has expired according to some embodiments of the present disclosure.

FIG. 4 shows a schematic diagram of an example of storage management process 400 in the case where target access information has expired according to some embodiments of the present disclosure. Since target access information 140-1 in node 130-1 has expired, node 130-1 will not return the metadata content in expired target access information 140-1 as the target metadata, but will search for unexpired target metadata in other nodes. To this end, at 420, node 130-1 may send the identification of the target metadata to the other nodes among the plurality of nodes. At 430, node 130-1 may receive the target metadata from the other nodes. Then, at 440, node 130-1 may provide user 120 with the target metadata.

In some embodiments, node 130-1 may also update stored target access information 140-1. Specifically, node 130-1 may update the metadata content in target access information 140-1 based on the unexpired target metadata received from the other nodes. In addition, node 130-1 may update the update time in target access information 140-1 based on the initiation time of the access request. Alternatively, node 130-1 may also update the update time in target access information 140-1 based on the time when the target metadata is received. Further, since target access information 140-1 is acquired, node 130-1 may increment the acquisition count in target access information 140-1.

Figure 5:
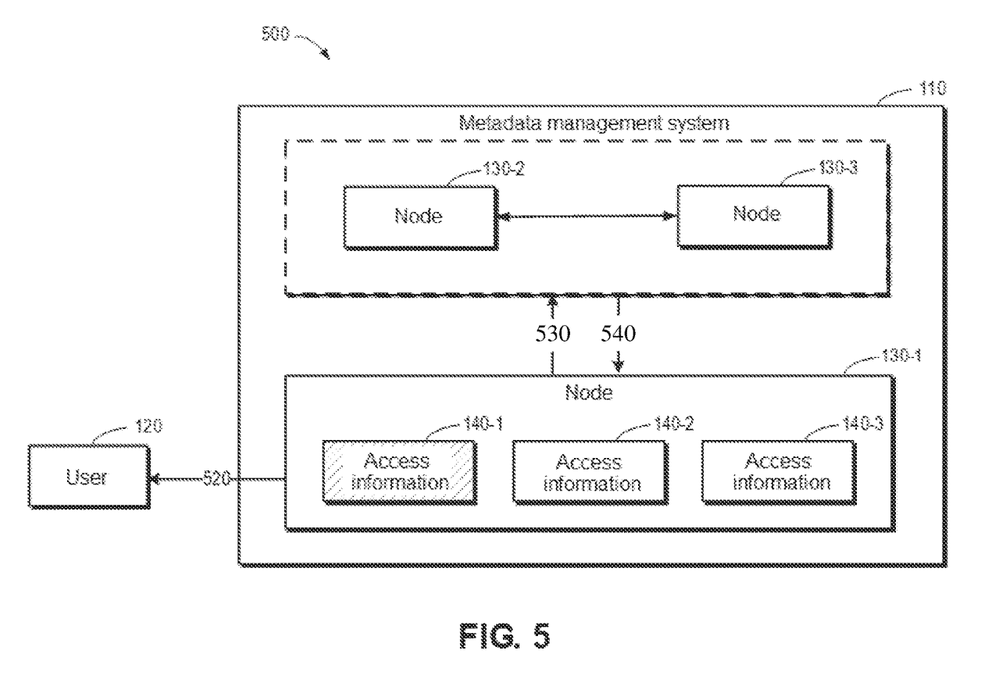
FIG. 5 shows a schematic diagram of an example of a storage management process in the case where target access information has not expired according to some embodiments of the present disclosure.

FIG. 5 shows a schematic diagram of an example of storage management process 500 in the case where target access information has not expired according to some embodiments of the present disclosure. Since target access information 140-1 in node 130-1 has not expired, node 130-1 may determine the metadata content in the target access information as the target metadata, and at 520, node 130-1 may provide user 120 with the target metadata.

In some embodiments, although target access information 140-1 in node 130-1 has not expired, it may not be the latest target metadata. In this case, node 130-1 may also update stored target access information 140-1. Specifically, at 530, node 130-1 may send the identification of the target metadata to the other nodes among the plurality of nodes. At 540, node 130-1 may receive updated target metadata from the other nodes. Node 130-1 may update the metadata content in target access information 140-1 based on the updated target metadata. In addition, node 130-1 may update the update time in target access information 140-1 based on the initiation time of the access request. Alternatively, node 130-1 may also update the update time in target access information 140-1 based on the time when the updated target metadata is received. Further, since target access information 140-1 is acquired, node 130-1 may increment the acquisition count in target access information 140-1.

Figure 6:
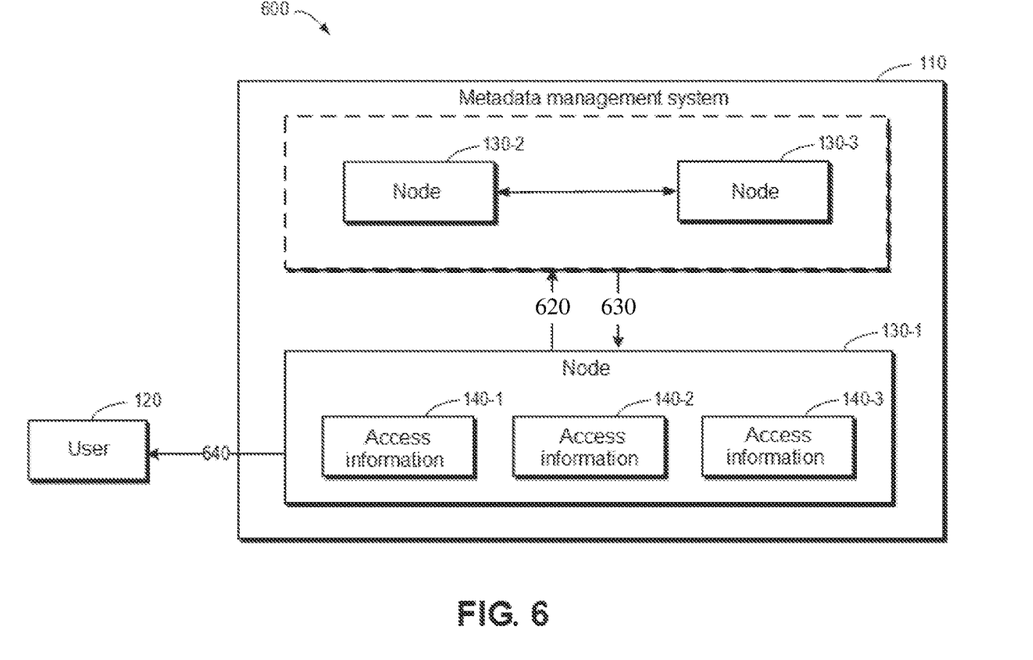
FIG. 6 shows a schematic diagram of an example of a storage management process in the case where target access information is not acquired according to some embodiments of the present disclosure.

The above describes the case where the target access information exists in node 130-1. However, in some cases, the target access information does not exist in node 130-1. In this case, the target access information cannot be acquired from the set of access information for user 120. FIG. 6 shows a schematic diagram of an example of storage management process 600 in the case where target access information is not acquired according to some embodiments of the present disclosure.

As shown in FIG. 6, if the target access information is not acquired from the set of access information for user 120, at 620, node 130-1 may send the identification of the target metadata to the other nodes among the plurality of nodes. At 630, node 130-1 may receive the target metadata from the other nodes. Then, at 640, node 130-1 may provide user 120 with the target metadata.

In some embodiments, node 130-1 may create the target access information, and store the target access information, for example, the target access information is added to an access information list specific to user 120. In some embodiments, node 130-1 may create the target access information based on the identification of the target metadata, the target metadata received from the other nodes, the initiation time of the access request, and a predetermined initial value of the acquisition count.

In some embodiments, the quantity of user 120-specific access information that node 130-1 can store may be limited. In this case, replacement algorithms such as least recently used (LRU) and first-in-first-out (FIFO) may be used to manage a set of user 120-specific access information stored in node 130. For example, node 130-1 may determine to-be-replaced access information from the set of access information. The to-be-replaced access information may satisfy the following conditions: the update time of the to-be-replaced access information exceeds a predetermined threshold time, and/or the acquisition count of the to-be-replaced access information exceeds a predetermined threshold count. For example, node 130-1 may replace the access information with the earliest update time, or replace the access information with the least acquisition count. Alternatively, node 130-1 may also perform replacement by considering both the update time and the acquisition count. After determining the to-be-replaced access information, node 130-1 may replace the to-be-replaced access information with the target access information.

Further, in some embodiments, when user 120 logs in to node 130-1, the set of access information specific to user 120 may not exist on node 130-1. To this end, when user 120 logs in to data protection system 110 via node 130-1, node 130-1 may determine whether the set of access information for user 120 is stored in node 130-1. If the access information has not been stored in node 130-1, node 130-1 may acquire the access information from the other nodes among the plurality of nodes. In this way, even if the user logs in to data protection system 110 at different times and in different geographic locations, it can also ensure the consistent user experience during the backup searching process.

In addition, when user 120 logs out of data protection system 110 via node 130-1, node 130-1 may also notify the other nodes among the plurality of nodes of the updated access information in the set of access information for user 120. In this way, other nodes may know to acquire the updated access information from node 130-1.

Figure 7:
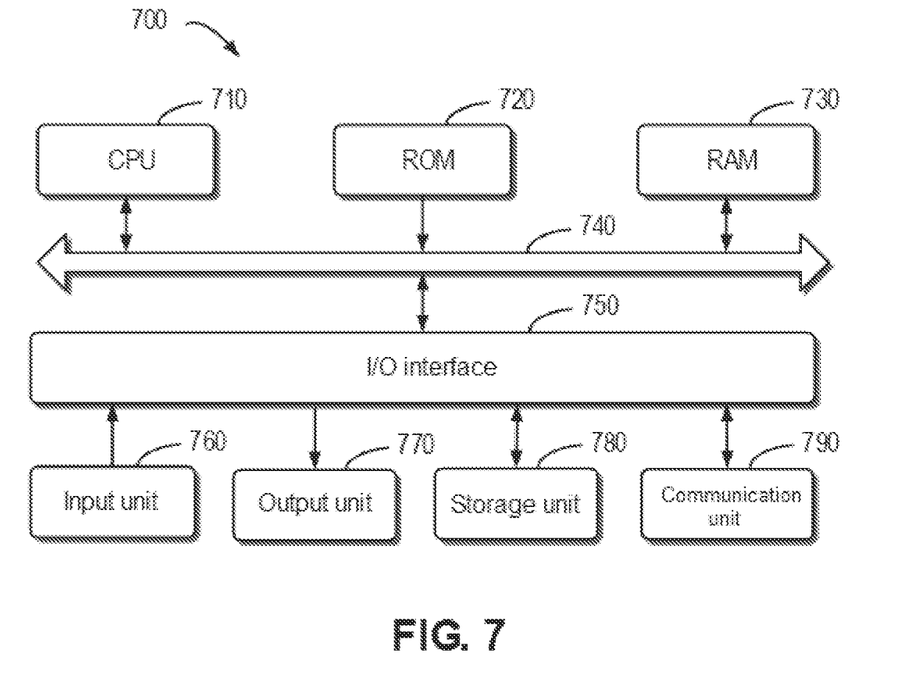
FIG. 7 shows a schematic block diagram of an example device that can be configured to implement an embodiment of the present disclosure.

FIG. 7 shows a schematic block diagram of example device 700 that can be configured to implement an embodiment of the present disclosure. For example, data protection system 110 as shown in FIG. 1 may be implemented by device 700. As shown in the figure, device 700 includes central processing unit (CPU) 710 that may perform various appropriate actions and processing according to computer program instructions stored in read-only memory (ROM) 720 or computer program instructions loaded from storage unit 780 to random access memory (RAM) 730. Various programs and data required for operations of device 700 may also be stored in RAM 730. CPU 710, ROM 720, and RAM 730 are connected to each other through bus 740. Input/output (I/O) interface 750 is also connected to bus 740.

A plurality of components in device 700 are coupled to I/O interface 750, including: input unit 760, such as a keyboard and a mouse; output unit 770, such as various types of displays and speakers; storage unit 780, such as a magnetic disk and an optical disc; and communication unit 790, such as a network card, a modem, and a wireless communication transceiver. Communication unit 790 allows device 700 to exchange information/data with other devices over a computer network such as the Internet and/or various telecommunication networks.

The various processes and processing described above, for example, methods 200 and 400-600, may be performed by processing unit 710. For example, in some embodiments, methods 200 and 400-600 may be implemented as a computer software program that is tangibly included in a machine-readable medium such as storage unit 780. In some embodiments, part or all of the computer program may be loaded and/or installed onto device 700 via ROM 720 and/or communication unit 790. When the computer program is loaded into RAM 730 and executed by CPU 710, one or more actions of methods 200 and 400-600 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for storage management, comprising:
    receiving an access request for target metadata from a user at a node among a plurality of nodes included in a data protection system, wherein the access request comprises an identification of the target metadata;
    based on the identification, acquiring target access information corresponding to the identification from a set of access information for the user, wherein the target access information records information related to access to the target metadata, wherein a replacement model is used to manage the set of access information stored in the node;
    when the target access information is not acquired from the set of access information, sending the identification to other nodes of the plurality of nodes;
    receiving the target metadata from the other nodes;
    creating the target access information based on the identification, the target metadata, an initiation time of the access request, and an initial value of an acquisition count;
    determining to-be-replaced access information from the set of access information, wherein the to-be-replaced access information satisfies at least one selected from a group consisting of:
        an update time of the to-be-replaced access information exceeding a threshold time, and
        a second acquisition count of the to-be-replaced access information exceeding a threshold count;
    replacing the to-be-replaced access information with the target access information; and
    providing the to-be-replaced access information to the user.

2. The method according to claim 1, wherein the target access information comprises at least one selected from a group consisting of:
    a metadata identification,
    metadata content,
    update time of the target access information, and
    the acquisition count of the target access information.

3. The method according to claim 1, further comprising:
    based on the target metadata, updating metadata content in the target access information; and
    based on the initiation time, updating an update time in the target access information.

4. The method according to claim 1, further comprising: providing the target metadata to the user.

5. The method according to claim 2, further comprising:
    in response to the target access information being acquired, incrementing the acquisition count in the target access information.

6. The method according to claim 1, further comprising:
when user logs into the data protection system via the node, determining whether the set of access information is stored in the node; and
when the set of access information has not been stored in the node, acquiring the set of access information from other nodes in the plurality of nodes.

7. The method according to claim 1, further comprising:
when user logs out of the data protection system via the node, notifying other nodes of the plurality of nodes of an updated access information in the set of access information.

8. An electronic device, comprising:
at least one processing unit; and
at least one memory coupled to the at least one processing unit and storing instructions configured to be executed by the at least one processing unit, wherein the instructions, when executed by the at least one processing unit, cause the electronic device to perform actions comprising:
  receiving an access request for target metadata from a user at a node among a plurality of nodes included in a data protection system, wherein the access request comprises an identification of the target metadata;
  based on the identification, acquiring target access information corresponding to the identification from a set of access information for the user, wherein the target access information records information related to access to the target metadata, wherein a replacement model is used to manage the set of access information stored in the node;
  when the target access information is not acquired from the set of access information, sending the identification to other nodes of the plurality of nodes;
  receiving the target metadata from the other nodes;
  creating the target access information based on the identification, the target metadata, an initiation time of the access request, and an initial value of an acquisition count;
  determining to-be-replaced access information from the set of access information, wherein the to-be-replaced access information satisfies at least one selected from a group consisting of:
    an update time of the to-be-replaced access information exceeding a threshold time, and
    a second acquisition count of the to-be-replaced access information exceeding a threshold count;
  replacing the to-be-replaced access information with the target access information; and
  providing the to-be-replaced access information to the user.

9. The electronic device according to claim 8, wherein the target access information comprises at least one selected from a group consisting of:
  a metadata identification,
  metadata content,
  update time of the target access information, and
  the acquisition count of the target access information.

10. The electronic device according to claim 8, wherein the actions further comprise:
  based on the target metadata, updating metadata content in the target access information; and
  based on the initiation time, updating an update time in the target access information.

11. A computer program product tangibly stored on a non-transitory computer-readable medium and comprising machine-executable instructions, wherein the machine-executable instructions, when executed, cause a machine to perform steps of a method, the method comprising:
  receiving an access request for target metadata from a user at a node among a plurality of nodes included in a data protection system, wherein the access request comprises an identification of the target metadata;
  based on the identification, acquiring target access information corresponding to the identification from a set of access information for the user, wherein the target access information records information related to access to the target metadata, wherein a replacement model is used to manage the set of access information stored in the node;
  when the target access information is not acquired from the set of access information, sending the identification to other nodes of the plurality of nodes;
  receiving the target metadata from the other nodes;
  creating the target access information based on the identification, the target metadata, an initiation time of the access request, and an initial value of an acquisition count;
  determining to-be-replaced access information from the set of access information, wherein the to-be-replaced access information satisfies at least one selected from a group consisting of:
    an update time of the to-be-replaced access information exceeding a threshold time, and
    a second acquisition count of the to-be-replaced access information exceeding a threshold count;
  replacing the to-be-replaced access information with the target access information; and
  providing the to-be-replaced access information to the user.

* * * * *